July 28, 1936.  C. R. BROWN  2,049,350

ELECTRICAL SWITCHGEAR

Filed April 27, 1934

Inventor:
Charles R. Brown,
by Harry E. Dunham
His Attorney

Patented July 28, 1936

2,049,350

UNITED STATES PATENT OFFICE 2,049,350

ELECTRICAL SWITCHGEAR

Charles R. Brown, Schenectady, N. Y., assignor to General Electric Company, a corporation of New York Application April 27, 1934, Serial No. 722,669

3 Claims. (Cl. 175—298)

My invention relates to electrical switchgear, more particularly to a circuit breaker panel unit for a comparatively low voltage feeder, and has for its principal object the provision of an improved and inexpensive single-feeder circuit breaker panel unit which is compact in design, simple and rugged in construction, and easily and quickly installed.

The use of grounded metal supporting and enclosing structure for electric bus and switch station units, including busbars and an oil circuit breaker for controlling the connection between the bus and branch circuit, is common practice and the advantages of this type of switchgear are well known in the art. In the comparatively low voltage range, as for example 2500 volts to 15,000 volts, the cubicle-unit type of switchgear is often used and comprises a box-like frame having sheet metal enclosing walls forming a cubicle within which a branch circuit or feeder-controlling oil circuit breaker and associated apparatus and connections are mounted. In certain branch circuit installations, however, the cost of the aforesaid cubicle-unit type precludes the use of the same, whereas the advantages of this type of metal supported and enclosed switchgear are highly desirable.

In accordance with my invention, a single sheet metal plate forming a panel is supported in a vertical position independently of a frame or cubicle construction. An oil circuit breaker and its associated operating mechanism, current transformers, and other connections are so mounted on said plate that many of the advantages of the metal enclosed cubicle design, including compactness and comparative safety, are obtained without involving the higher cost thereof.

My invention will be more fully set forth in the following description referring to the accompanying drawing, and the features of novelty which characterize my invention will be pointed out with particularity in the claims annexed to and forming a part of this specification.

Figure 1:
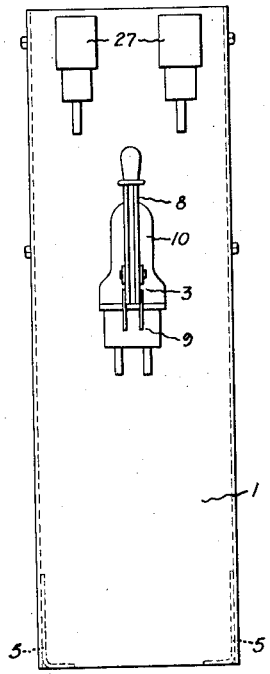
Figure 2:
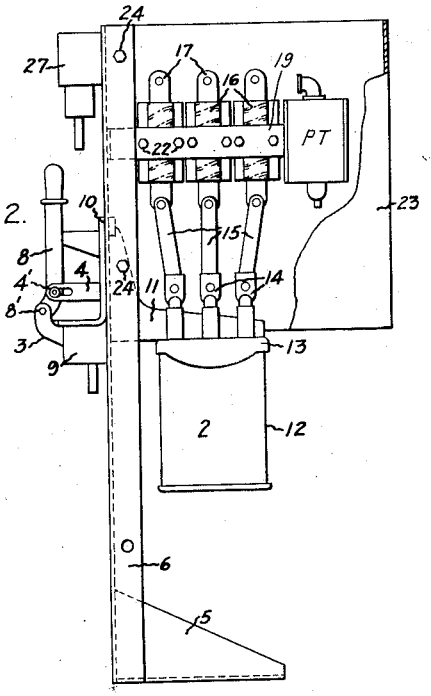
Figure 4:
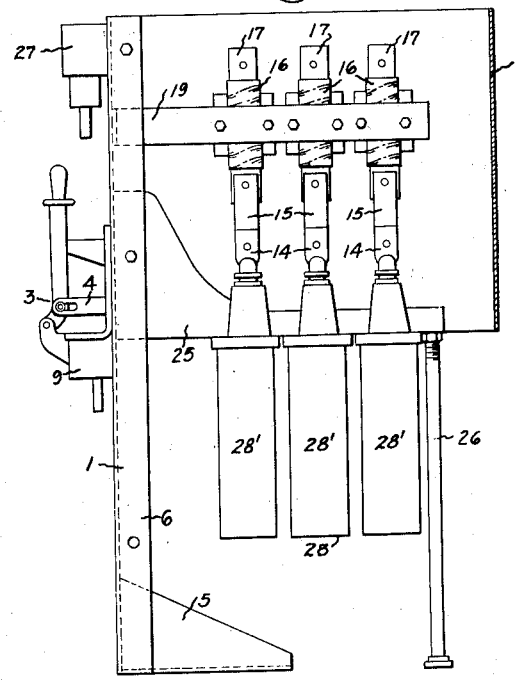
Figure 3:
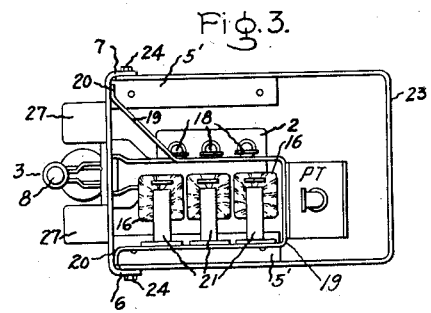

Referring to the drawing, Fig. 1 is an elevational front view of a single-feeder circuit breaker panel unit embodying my invention; Fig. 2 is an elevational side view, partly in section, of the unit shown in Fig. 1; Fig. 3 is a plan top view of the unit shown in Figs. 1 and 2, and Fig. 4 is an elevational side view, partly in section, of a similar unit designed for higher voltages.

In general, the circuit arrangement in electrical switchgear of the above type comprises a source of power, a branch circuit or feeder, an oil circuit breaker for controlling the feeder or branch circuit, and the usual current transformers, meters and relays for purposes of metering and control.

In Figs. 1 and 2 there is shown a single-feeder circuit breaker panel unit comprising a rectangular sheet metal plate 1 forming a panel, as illustrated, having an oil circuit breaker 2 mounted directly on the rear side of the plate, and suitable operating mechanism, either manual or electrical, indicated at 3 mounted on the opposite side or front of the plate having means, as a link 4, extending through the plate for operating the circuit breaker to open or closed circuit position. The panel formed by the plate 1 is preferably of comparatively thick sheet metal so that it is self-supporting and is vertically positioned, as by flanged legs 5 secured as by welding to the lower part of said plate. The legs 5 have inwardly turned flanges 5' (Fig. 3) having apertures as illustrated for bolting the legs 5 to suitable base blocks. The plate 1 is likewise provided at its vertical edges with inwardly turned flanges 6 and 7 which serve to strengthen the panel and likewise to provide means for mounting and assembling the equipment as hereinafter described.

The oil circuit breaker 2 is of the three-phase low-voltage type and may be of any suitable design as where the circuit of each phase is interrupted by a bridging member (not shown) descending into the oil tank. Since this type of breaker is very well known in the art, further detailed description of the same and its operating mechanism at this point is believed to be unnecessary other than to point out that the manual operating mechanism 3 shown by way of example includes a hand lever 8 pivotally mounted at 8' and connected to the link 4 through a pin-and-slot connection 4' for effecting elevation of the bridging structure and closing of the circuit.

The operating mechanism 3 likewise comprises the usual tripping solenoid 9 operatively related to the link 4 which forms a part of suitable collapsible thrust-transmitting structure (not shown) interconnecting the hand lever 8 and the movable bridging structure of the circuit breaker. The aforesaid operating mechanism comprises a mounting plate 10 which is suitably secured to the front of the panel.

Opposite the operating mechanism at the rear of the panel a cantilever type arm 11 is suitably secured to the plate 1 for supporting at its free end the oil circuit breaker 2 so as to overhang the base of the panel.

The circuit breaker 2 which comprises an oil tank 12, cover structure 13, and phase terminal connections 14 extending through said cover structure is electrically connected by conductors 15 to current transformers 16 mounted substantially above and in overhanging relation to said breaker. The current transformers 16 are provided with terminals 17 for connection to the branch circuit or feeder cables and the corresponding opposite terminals 18 of the circuit breaker (Fig. 3) are adapted to be connected to the source of power. Accordingly, opening of the circuit breaker is effective to disconnect the branch circuit from the source of power.

The means for mounting the current transformers 16 may comprise a suitable supporting arm or bracket structure 19 formed, in the present instance, by a U-shaped metal strip secured at its opposite ends as at 20 to the rear of the plate 1 and shaped so as not to obstruct the cables connected to the terminals 18. The current transformers 16 comprise supporting members 21 directly secured as by bolts 22 to the inner side of the bracket structure 19, as illustrated by Figs. 2 and 3. It will be apparent, of course, that a single bracket or cantilever-type of arm may be used to support the current transformers.

Where required, a potential transformer, designated as "P. T.", may be suitably mounted on the bracket structure 19 as illustrated for example by Figs. 2 and 3.

The switchgear above described accordingly comprises a simple, self-supporting and self-contained unit which insures comparative safety for the operator in view of the sheet metal panel which is directly interposed between the operating mechanism and the live portions of the circuit. For the purpose of insuring added safety, a sheet metal wall structure 23, open at its upper and lower ends as illustrated, is suitably secured to the flanges 6 and 7 as by bolts 24 so that the current transformers and all terminal connections, including the terminal connections of the circuit breakers, are surrounded by the metal wall or guard 23. The lower edge of the wall structure 23 extends to the cover 13 of the circuit breaker so that the oil tank 12 which extends beneath may be readily lowered and removed in case of inspection or repair of the breaker.

Where a plurality of units similar to that above described are required, as in the case of multiple-feeder control, the units may be mounted in alinement and the corresponding flanges 6 and 7 of adjacent units bolted together so as to form a continuous switch panel.

Fig. 4 illustrates a similar unit having a somewhat larger circuit breaker 28 for higher voltage. In this case the circuit breaker 28 comprises individual oil tanks 28' for the three phases and the switch supporting arm 25 is braced at its outer end by a strut 26 detachably secured thereto. The unit is otherwise generally similar to that of Figs. 1, 2 and 3 and corresponding structure is designated by similar reference numerals. On all units, suitable control means, as relays generally indicated at 27, are mounted on the front of the panel together with indicating meters as required.

The above switchgear is particularly applicable as incoming service panels for industrial plants, panels for protection and control of motor circuits, isolated feeder panels, and station auxiliary panels and has the practical advantage that it may be factory built and shipped as completely assembled and tested units. The units may be installed and placed in service immediately with practically no preliminary labor cost other than connection to the power and branch circuit cables. Since the panels are self-contained, portable and self-supporting, they may be easily moved from one location to another, and as above pointed out may be detachably related to similar units forming a multiple feeder switch station.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. A portable circuit breaker panel unit comprising a rectangular sheet metal plate forming a panel, a laterally extending brace secured only to the base of said plate and at one side thereof for vertically positioning the same, a circuit breaker mounted on the aforesaid side of said plate and supported solely thereby so as to overhang said brace, operating mechanism for said breaker mounted on the opposite side of said plate and extending through the same, supporting structure secured to said plate above said circuit breaker, and current transformers mounted on said structure and overhanging said breaker, the terminals of said current transformers being generally in vertical alinement for connection with said circuit breaker and with associated circuits.

2. A circuit breaker panel unit comprising a sheet metal plate forming a panel, bracing means for vertically positioning said plate, supporting structure secured to one side of said plate, a circuit breaker mounted on said structure, said circuit breaker having terminal connections extending vertically from the top thereof, current transformers mounted on said plate and overhanging said circuit breaker, the terminals of said current transformers being vertically alined for providing substantially direct connections with the associated breaker terminal connections, and an operating mechanism for said breaker mounted on the opposite side of said plate and extending therethrough.

3. A circuit breaker panel unit comprising a sheet metal plate forming a panel, bracing means at the base of said plate for vertically positioning the same, a circuit breaker including an oil tank and terminal connections extending through the cover structure thereof mounted on one side of said plate above said base, operating mechanism for said breaker mounted on the opposite side of said plate and extending therethrough, bracket structure mounted on said plate directly overhanging said circuit breaker, current transformers connected to said circuit breaker mounted on said bracket structure, and a sheet metal wall structure mounted on the upper portion of said plate and surrounding said current transformers and the terminal connections of said breaker only, the oil tank of said breaker extending beneath said wall structure.

CHARLES R. BROWN.